US009936364B2

(12) United States Patent
De Leo et al.

(10) Patent No.: US 9,936,364 B2
(45) Date of Patent: Apr. 3, 2018

(54) MOBILE DEVICE WIRELESS IDENTIFIER ASSIGNMENT FOR EMERGENCY CALLS

(71) Applicant: Cisco Technology, Inc., San Jose, CA (US)

(72) Inventors: Michael De Leo, Sunrise, FL (US); Marc Linsner, Marco Island, FL (US); Bryan M. Mclaughlin, Lancashire (GB); Jagdish Girimaji, Pleasanton, CA (US); Andrew Myles, Turramurra (AU)

(73) Assignee: Cisco Technology, Inc., San Jose, CA (US)

( * ) Notice: Subject to any disclaimer, the term of this patent is extended or adjusted under 35 U.S.C. 154(b) by 114 days.

(21) Appl. No.: 14/601,347

(22) Filed: Jan. 21, 2015

(65) Prior Publication Data

US 2016/0007177 A1 Jan. 7, 2016

Related U.S. Application Data

(60) Provisional application No. 62/020,730, filed on Jul. 3, 2014.

(51) Int. Cl.
*H04W 4/22* (2009.01)
*H04W 4/02* (2018.01)
*H04W 84/12* (2009.01)

(52) U.S. Cl.
CPC ............... *H04W 4/22* (2013.01); *H04W 4/02* (2013.01); *H04W 84/12* (2013.01)

(58) Field of Classification Search
CPC . H04W 4/22; H04W 76/007; H04W 36/0022; H04W 36/0033; H04W 36/0083; H04W 88/18; H04W 76/028; H04W 36/0066; H04W 36/12
See application file for complete search history.

(56) References Cited

U.S. PATENT DOCUMENTS

| 8,010,079 | B2 | 8/2011 | Mia et al. | |
|---|---|---|---|---|
| 8,644,301 | B2 | 2/2014 | Tamhankar et al. | |
| 8,682,279 | B2 | 3/2014 | Rudolf et al. | |
| 8,849,283 | B2 | 9/2014 | Rudolf et al. | |
| 2004/0203572 | A1* | 10/2004 | Aerrabotu | H04W 4/22 455/404.1 |
| 2004/0242191 | A1* | 12/2004 | Hossain | H04W 4/22 455/404.1 |

(Continued)

*Primary Examiner* — Quan M Hua
(74) *Attorney, Agent, or Firm* — Edell, Shapiro & Finnan, LLC

(57) ABSTRACT

An emergency caller location system uses enterprise Wireless Local Area Network (WLAN) location systems to provide more accurate location information on an emergency caller. A cellular telephone modifies its WLAN identifier, such as its Media Access Control (MAC) address, in response to a user initiating an emergency call. The MAC address is modified based on an identifier known to the cellular network, such as the phone number, subscriber name, International Mobile Equipment Identifier (IMEI), International Mobile Subscriber Identifier (IMSI), and/or International Circuit Card Identifier (ICCID). The cellular telephone may additionally modify the probe timer of the WLAN interface to enhance the ability of the WLAN location system to determine the location of the device.

20 Claims, 6 Drawing Sheets

(56) References Cited

U.S. PATENT DOCUMENTS

| | | | |
|---|---|---|---|
| 2005/0059353 A1* | 3/2005 | Smith | H04W 24/00 455/67.11 |
| 2005/0090225 A1 | 4/2005 | Muehleisen et al. | |
| 2005/0232189 A1* | 10/2005 | Loushine | H04W 64/00 370/328 |
| 2006/0030290 A1* | 2/2006 | Rudolf | H04W 76/007 455/404.1 |
| 2007/0149211 A1* | 6/2007 | Dunn | H04W 4/02 455/456.1 |
| 2011/0009085 A1* | 1/2011 | Albanes | H04W 4/02 455/404.1 |
| 2011/0194553 A1* | 8/2011 | Sahin | H04W 4/22 370/352 |

\* cited by examiner

MOBILE DEVICE WIRELESS IDENTIFIER ASSIGNMENT FOR EMERGENCY CALLS

CROSS-REFERENCE TO RELATED APPLICATION

This application claims priority to U.S. Provisional Application No. 62/020,730, filed Jul. 3, 2014, the entirety of which is incorporated herein by reference.

TECHNICAL FIELD

The present disclosure relates to providing location information for wireless devices.

BACKGROUND

The application of summoning emergency assistance by using a phone to call 9-1-1 has been ingrained in our society for 40+ years. A successful emergency response is dependent upon the responders receiving accurate location information to effect timely action. Traditional wireline telephony is able to utilize the location of the physical wires as a source of information for caller location, whereas wireless technologies require more exotic mechanisms to locate a 9-1-1 caller.

The industry accepted practice for locating a wireless 9-1-1 caller actually employs a multi-step process. The timing of the various steps is important such that the human caller does not get impatient and abandon the call prior to talking to the Public Safety Answer Point (PSAP). The mechanism(s) used to determine the location of a wireless device takes time, and this amount of time is typically more than expected for a normal wireline phone call to get answered. As a result, some people, in frustration, may have a tendency to hang-up, assuming something is wrong when the call does not go through in a few seconds. This frustration may be exaggerated during a time of stress in an emergency situation. In addition, since the number 9-1-1 resembles an anycast destination (i.e., it should be routed to the nearest destination node in a group of potential receivers), a rough location of the caller must, in the first instance, be determined in order to decide which PSAP to route the call to. Hence, the industry uses a multi-step procedure, starting with cell tower location associated with the call to determine the correct PSAP for call routing. A more precise caller location determination occurs during the call, after the initial call setup.

DESCRIPTION OF EXAMPLE EMBODIMENTS

Overview

Figure 1:
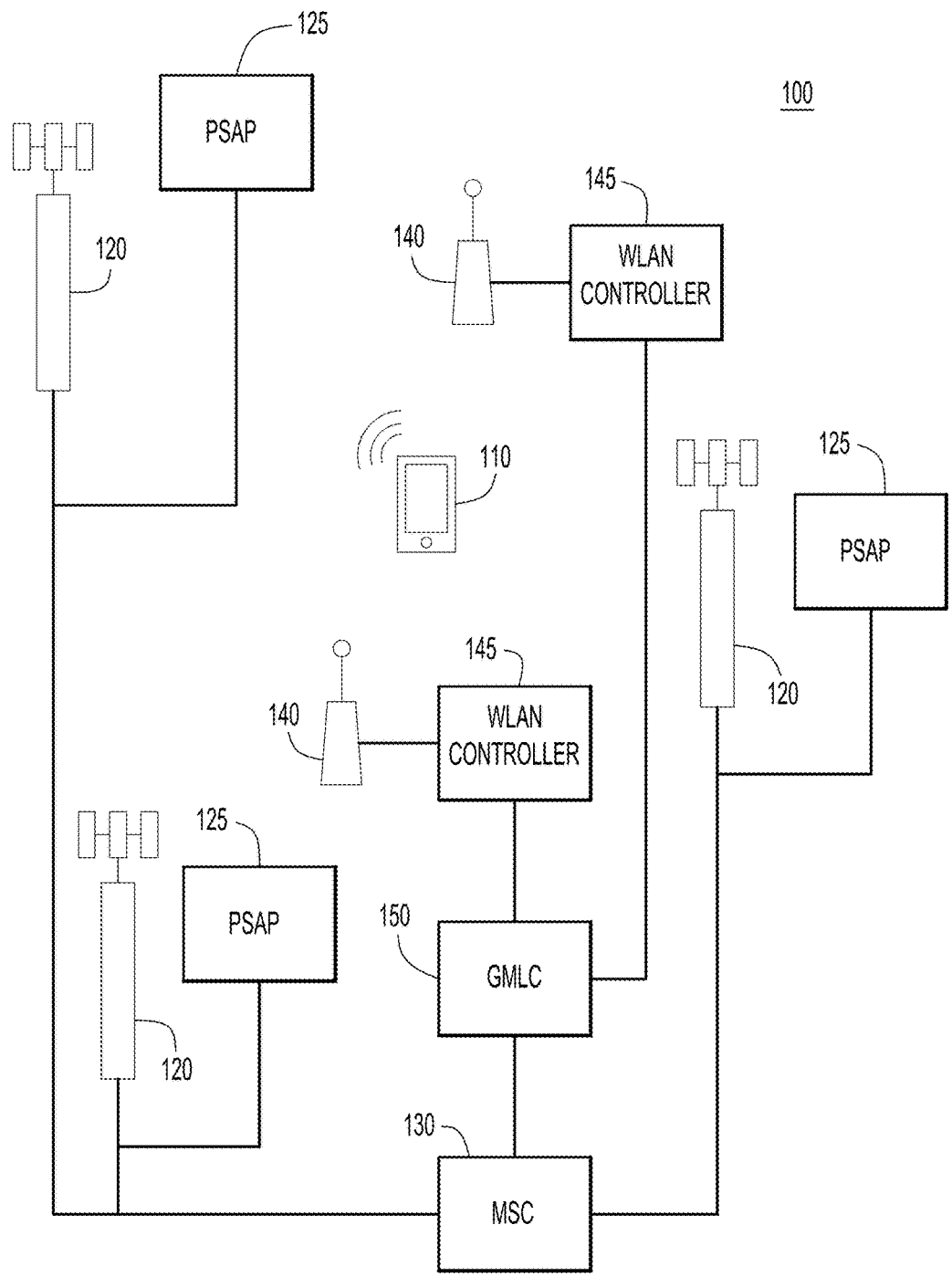
FIG. 1 is a system block diagram showing components of a location determination system according to an example embodiment.

An apparatus is provided comprising a cellular telephone network interface, a wireless network interface, and a processor. The cellular telephone network interface is used to communicate data between the apparatus and a cellular network, in which the apparatus is identified to the cellular network by at least one known identifier. The wireless network interface is used to communicate data between the apparatus and a wireless computer network, in which the apparatus is identified with a wireless network identifier. The processor initiates an emergency call over the cellular telephone network interface in response to a user input requesting an emergency call. The processor also modifies the wireless network identifier to an emergency wireless network identifier based on the at least one known identifier.

DETAILED DESCRIPTION

One example of locating a wireless caller after a 9-1-1 call has been established is for cellular location determination equipment (e.g. a Gateway Mobile Location Center (GMLC) or Serving Mobile Location Center (SMLC)) to continue the location determination task by invoking a set of chosen processes. The particular Cellular Service Provider handling the call determines which technology to deploy for this task, but current trends are migrating to utilize on-board Global Positioning System (GPS) functionality in the caller's device. Other technologies include various network based radio frequency (RF) signal measurement technologies such as: Angle of Arrival; Time of Arrival; Time Difference of Arrival; Location Pattern Matching; etc. Each of the location determination technologies may have their individual "sweet spots" where they perform at their highest accuracy, but a known issue is that locating a device that is inside a building is where each has accuracy problems. Additionally, since large buildings have many floors and many rooms on each floor, accurate location within a building is vital to a timely response to an emergency.

Wi-Fi™ networks are increasingly in use, not only within office environments, but retail establishments either have or are implementing Wi-Fi networks for both customer convenience and as a portal to communicate with consumers for customer service and advertising. In other words, Wi-Fi is almost ubiquitous in public buildings. Notably, the underlying 802.11 control plane has supported processes associated with device location determination for several years. Wi-Fi equipment suppliers such as Cisco™ offer location services that can locate a Wi-Fi device within a few meters of accuracy. Since the cellular accuracy of wireless 9-1-1 callers when indoors is very poor using outdoor-based systems, allowing cellular processes to include the available 802.11 device location mechanisms enables increased accuracy for locating wireless 9-1-1 callers.

Typically, suppliers of Wi-Fi location aware equipment offer a centralized location controller/server that can communicate using industry standard protocols. In the cellular network, device location control protocols are based on Open Mobile Alliance (OMA) standards protocols, which are different from Wi-Fi related protocols. Embodiments described herein provide a gateway that can take a location request in accordance with the OMA protocols and query the Wi-Fi location server in the enterprise network. One approach would be for the cellular service to discover the Wi-Fi identifier (e.g., the Media Access Control (MAC) address) of a cellular device. This identifier would then be used to query the Wi-Fi location server. Security and privacy considerations may be taken into account for such a service to be accepted by the general public.

Of course, not all cell phones have Wi-Fi interfaces, but as of 2014, research shows that smartphones now account for over 60% of all cell phones and the number is climbing rapidly, from <40% in 2011 to over 60% currently. In accordance with the embodiments described herein, it is not required that the smartphone joins the enterprise Wi-Fi network in order to locate the device, only that the Wi-Fi interface be turned on. The majority of users leave the Wi-Fi interface enabled for ease of roaming when within reach of a known Wi-Fi network. In an example in which the Wi-Fi interface is turned off (e.g., geofencing Wi-Fi access, power conservation, etc.), the smartphone may automatically turn on the Wi-Fi interface when an emergency call is made, to assist in providing an accurate location as described herein.

As noted above, a preliminary or initial location of a 9-1-1 caller may be discovered for the purposes of routing the call to the proper PSAP. Since enterprise Wi-Fi location enabled networks may be individually queried, a list of enterprises with location discovery access may be geodetically catalogued. Thus, using the initial location information, such a list of enterprise Wi-Fi networks may be queried in parallel by the cellular telephone system, if the cellular telephone system knows the corresponding Wi-Fi network identifier (e.g., MAC address). For instance, the cellular telephone system may simply query each one of the Wi-Fi controllers if it has knowledge of the location for a Wi-Fi network identifier belonging to the emergency caller. If the number of Wi-Fi networks that are to be queried is too large to handle in the timely manner, further cellular network location determination can be accomplished to narrow down the list of enterprise network candidates.

One such mechanism that some cellular networks offer for device location is called Observed Time Difference of Arrival (OTDOA). OTDOA uses a mechanism where a user device observes a timing signal for multiple transmitters and sends those observations to a network based Evolved Serving Mobile Location Center (ESMLC). The ESMLC has knowledge of the timing signal and can then calculate the position of the user device using the observations. The resultant position could then be used by the cellular telephone system to narrow down the Wi-Fi networks for query to a smaller geographical area.

Referring now to FIG. 1, an example system 100 is configured to use the emergency caller location system according to one embodiment. A mobile device 110 with both cellular network capability (e.g., code division multiplex access (CDMA), time division multiplex access (TDMA), Global System for Mobile communication (GSM), etc.) and Wi-Fi network capability (i.e., 802.11) is shown. Three cellular towers 120 are shown, each with an associated PSAP 125 to service a geographical area. A Mobile Switching Center (MSC) 130 handles the cellular calls through each of the towers. Two enterprise Wireless Local Area Network (WLAN) access points 140 controlled by WLAN controllers 145 are also shown. A Gateway Mobile Location Center (GMLC) 150 communicates with both the WLAN controllers 145 and the MSC 130 to provide the emergency caller location service described herein.

In other examples, more or fewer of each of the duplicated elements (e.g. cellular towers 120, access points 140, and/or WLAN controllers 145) are also envisioned within the scope of the system 100. For example, multiple access points 140 may be controlled by a single WLAN controller 140, multiple PSAPs 125 may be associated with one of the cellular towers 120, and/or one PSAP 125 may be associated with multiple cellular towers 120. The depicted quantity of the elements is not intended to limit the scope of the emergency location system 100 as described herein.

In one example of the emergency caller location system 100, an end user dials the emergency number on their mobile device 110. The MSC 130 queries the GMLC 150 for call routing. The GMLC 150 utilizes cell tower/sector information to determine the correct PSAP 125 and instructs the MSC 130 how to route the call. While the MSC 130 completes the emergency call between the mobile device 110 and the appropriate PSAP 125, the GMLC 150 may launch a follow-on location determination process, in anticipation of the PSAP 125 requesting more accurate location information. In one case, the GMLC 150 determines the caller may be located indoors (e.g., the mobile device 110 is unable to provide GPS location information) and may be within range of an enterprise wireless network with location awareness capabilities.

To locate the mobile device 110 through the location aware wireless network system, the GMLC 150 determines the emergency wireless network identifier (e.g., Wi-Fi MAC address) of the calling device 110. The emergency wireless network identifier may be algorithmically linked to one or more values known to the cellular provider, such as the International Mobile Equipment Identity (IMEI), International Mobile Subscriber Identity (IMSI), International Circuit Card Identifier (ICCID), the subscriber name, and/or the telephone number. The GMLC 150 queries any enterprises (i.e., WLAN controllers 145) within the rough geographical area to determine if any of the enterprise WLANs has detected a probe request with the emergency wireless network identifier linked to the mobile device 110.

Once the GMLC 150 finds the device 110 at an enterprise location, the GMLC 150 can respond to follow-on queries from the PSAP 125 for more accurate location information. The PSAP 125 can then provide more accurate location information to emergency responders that are dispatched to assist the end user who called for emergency services on mobile device 110.

Figure 2:
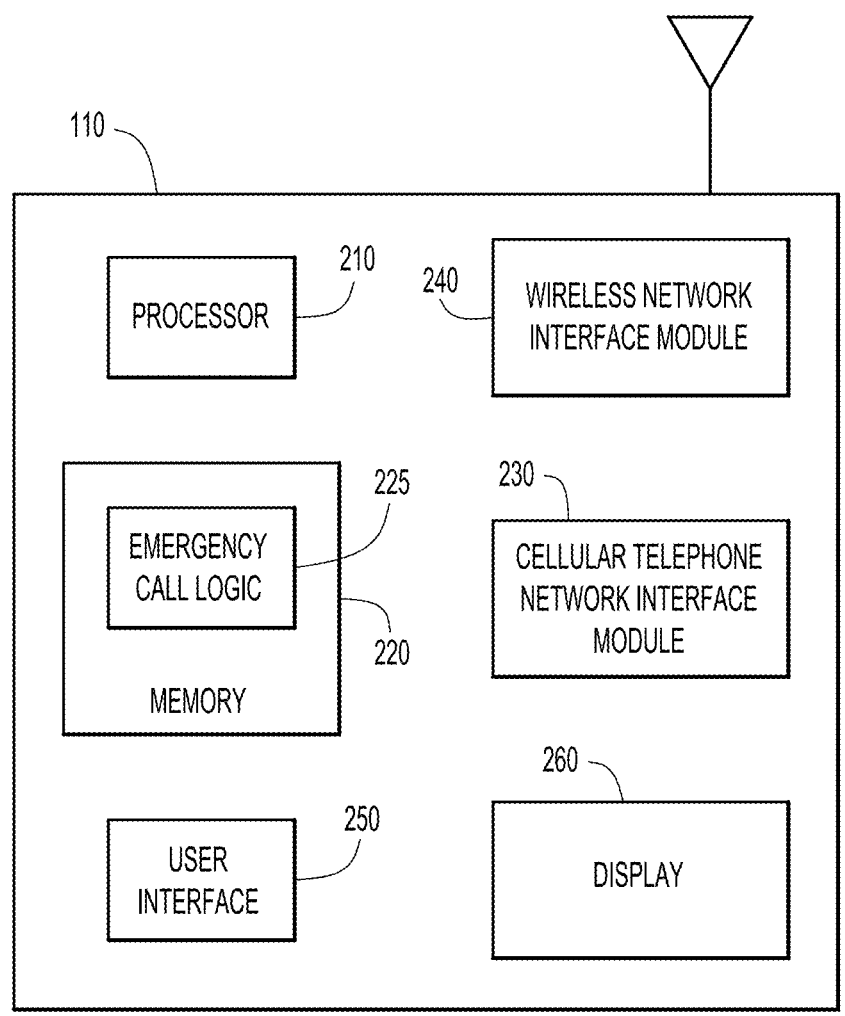
FIG. 2 is a simplified block diagram of a mobile device configured to use the emergency location system according to an example embodiment.

Referring now to FIG. 2, a simplified block diagram of a mobile device 110 is shown. The mobile device 110 includes a processor 210 to process instructions relevant to the operations of the device, and memory 220 to store a variety of data and software instructions (e.g., audio, video, operating system, etc.), including emergency call logic 225. The mobile device 110 also includes a cellular telephone network interface module 230 configured to route telephone calls over a cellular network. The mobile device 110 further includes a wireless network interface module 240 configured to route data and communicate with computing devices over a wireless computer network (e.g., a Wi-Fi network). The mobile device 110 includes a user interface 250, e.g., a touch screen, one or more physical buttons, a microphone, etc., to receive input from the user. The user interface 250 further includes a display 260 to provide visual output to the user, one or more speakers to provide audio output to the user, and one or more vibration elements to provide tactile output to the user.

Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software (e.g., the emergency call logic) comprising computer executable instructions and when the software is executed (by the processor 210) it is operable to perform the operations described herein.

Figure 3:
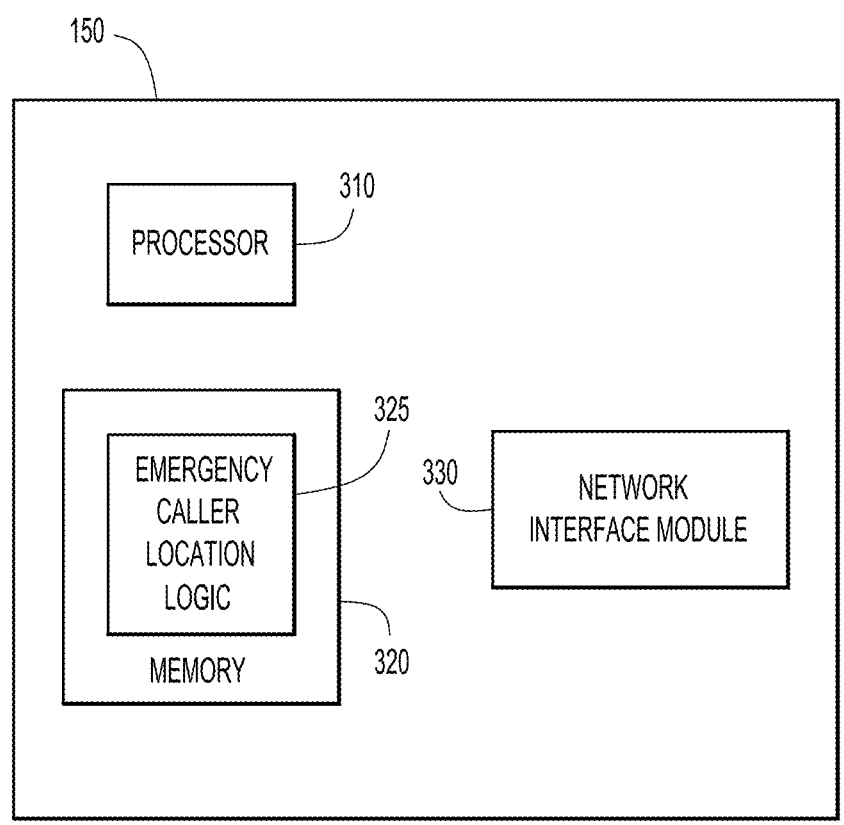
FIG. 3 is a simplified block diagram of a Gateway Mobile Location Center that is configured to use the emergency location system according to an example embodiment.

Referring now to FIG. 3, a simplified block diagram of a GMLC 150 is shown. The GMLC 150 includes a processor 310 to process instructions relevant to providing location services to the cellular provider, and memory 320 to store a variety of data (e.g., a geographical list of enterprise WLANs, etc.) and software instructions (e.g., emergency caller location logic 325, etc.). The GMLC 150 also includes a network interface unit (e.g., a card) 330 to communicate with other devices, such as the WLAN controllers 145 and/or the MSC 130. Memory 320 may comprise read only memory (ROM), random access memory (RAM), magnetic disk storage media devices, optical storage media devices, flash memory devices, electrical, optical, or other physical/tangible (e.g., non-transitory) memory storage devices. The processor 310 is, for example, a microprocessor or microcontroller that executes instructions for implementing the processes described herein. Thus, in general, the memory 320 may comprise one or more tangible (non-transitory) computer readable storage media (e.g., a memory device) encoded with software comprising computer executable instructions and when the software is executed (by the processor 310) it is operable to perform the operations described herein.

Figure 4:
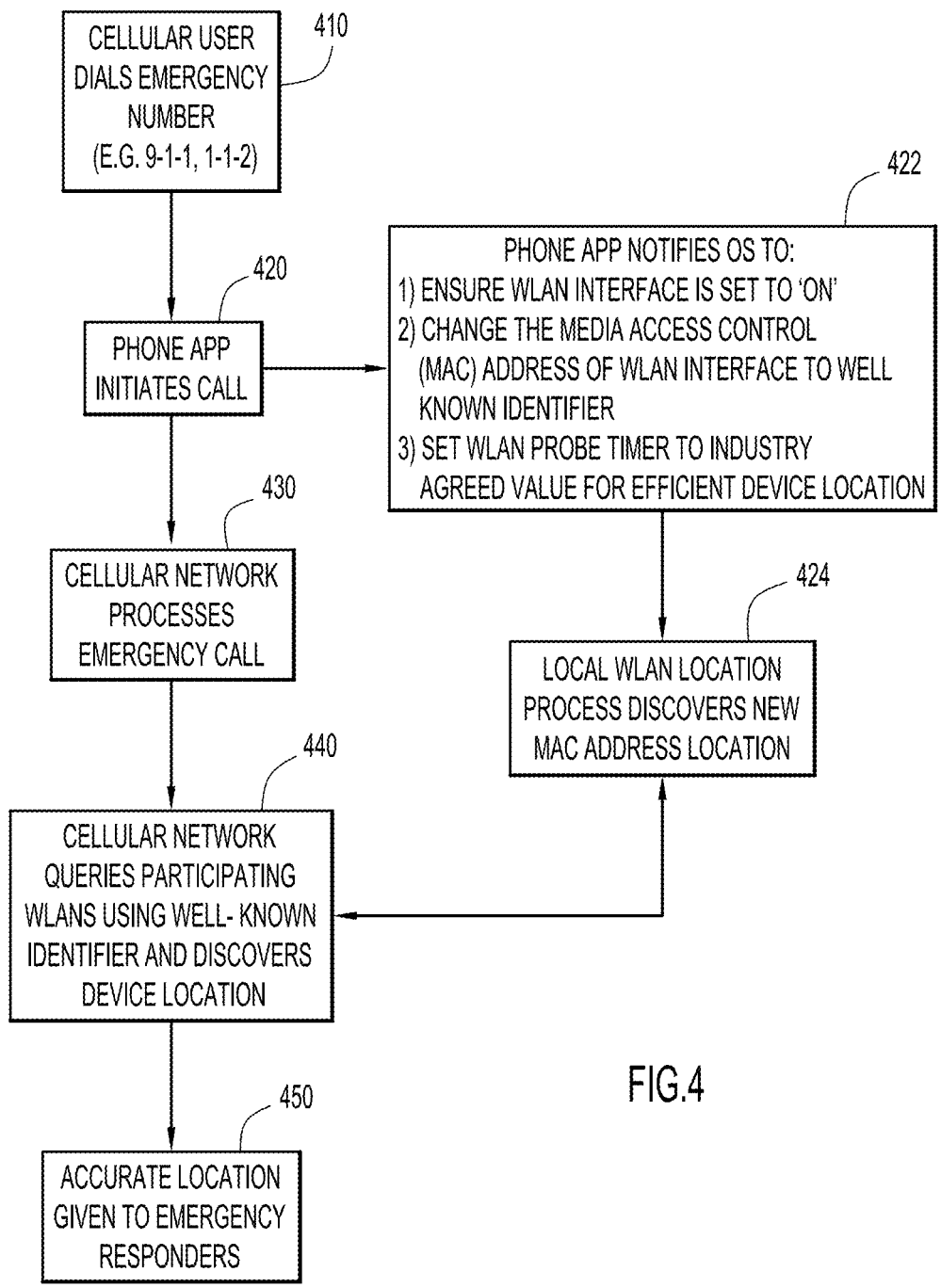
FIG. 4 is a flow diagram illustrating the operations in the emergency location system according to an example embodiment.

Referring now to FIG. 4, a flow chart shows the operations in the emergency location system according to an example embodiment. Initially, at 410, the cellular user dials an emergency number (e.g., 9-1-1, 1-1-2, 9-9-9) from the user's mobile device, such as a smart phone. A phone application initiates the emergency call at 420 and, at 422, notifies the operating system of the phone to modify the WLAN interface to assist in the location system. The operating system ensures that the WLAN interface is turned on, changes the wireless network identifier (e.g., MAC address) of the WLAN interface to an "emergency wireless network identifier" based on an identifier known to the cellular network, and sets the WLAN probe timer to a value that allows for efficient device location. The mobile device transmits the emergency wireless network identifier to a nearby WLAN controller as part of a Wi-Fi handshake (e.g., as a probe request). In one example, the probe timer may be increased such that probe requests are sent more frequently, which prioritizes efficient device location over power conservation.

Upon receipt of the emergency wireless network identifier by the WLAN controller, the emergency wireless network identifier is added to a table of nearby devices, such as a table of MAC addresses of connected wireless devices. That table may also include location information associated with the respective wireless devices.

After the operating system of the phone has modified the wireless network identifier, and perhaps the probe timer, a local WLAN location process detects the emergency wireless network identifier that has transmitted by the mobile device and determines the location of the emergency caller at 424, e.g., by looking up the emergency network identifier in the table stored at the WLAN controller. At 430, the cellular network processes the emergency call initiated by the phone application, and routes the call to the appropriate PSAP. At 440, the cellular network queries any participating WLAN controllers using the emergency wireless network identifier based on the known identifier(s), and discovers the device location from the appropriate WLAN controller. In one example, the cellular network queries the WLAN controllers through the GMLC that is coupled to MSC and the WLAN controllers. The cellular network can then forward the more accurate location from WLAN detection to emergency responders at 450.

Changing the wireless network identifier to an emergency wireless network identifier based on an identifier known to the cellular network may comprise changing the MAC address to the IMEI, IMSI, ICCID, subscriber name, or phone number of the smart phone. Alternatively, the emergency wireless network identifier may be algorithmically linked to one or more of the identifiers known to the cellular network. Since the smart phone making the emergency call uses an emergency wireless network identifier based on one or more identifiers known to the cellular network, the cellular network is not required to maintain a database correlating wireless network identifiers with cellular devices. Removing any need to perform a database lookup allows the cellular system to locate the emergency caller faster, since there is no time spent querying a database for the wireless network identifier associated with a particular mobile device.

Figure 5:
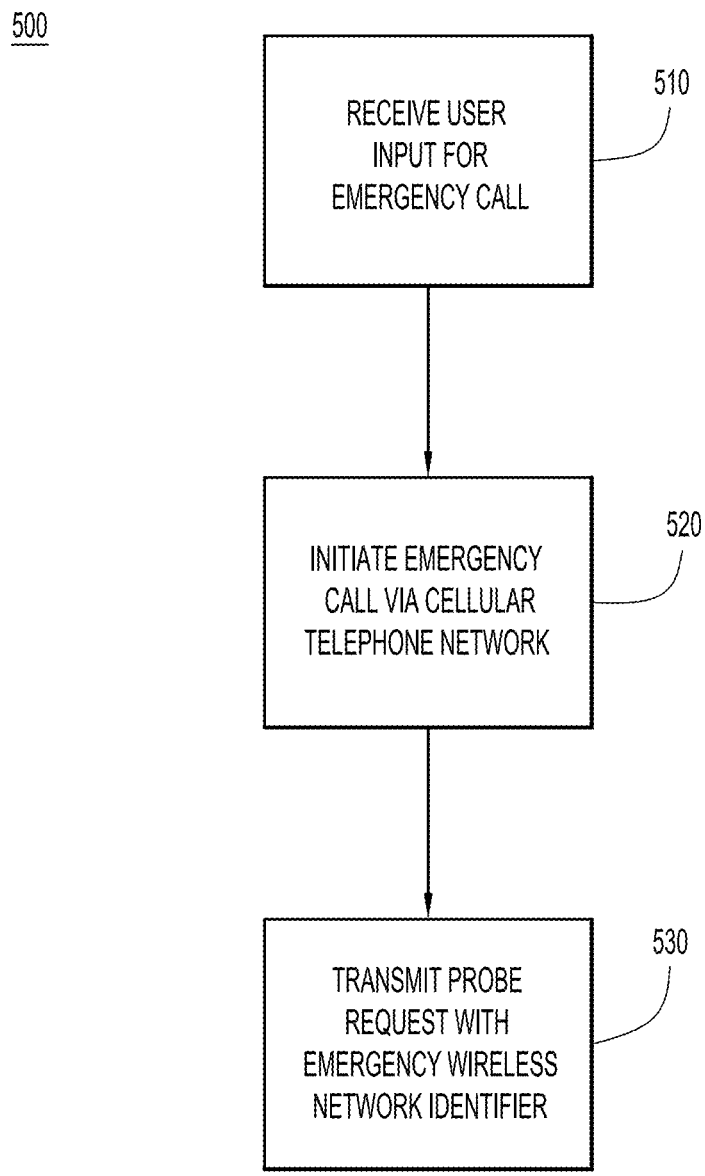
FIG. 5 is a flow diagram illustrating the operations in a mobile user device that enable the emergency location system according to an example embodiment.

Referring now to FIG. 5, a flow chart shows the operations in process 500 for assisting in providing location information during an emergency call. Initially, at 510, a mobile device 110 receives user input for an emergency call. The mobile device 110 initiates the emergency call via its cellular telephone network interface at 520. At 530, the mobile device 110 uses its wireless network interface to transmit probe requests with an emergency wireless network identifier. The emergency wireless network identifier may be algorithmically linked to an identifier known to the cellular network, such as the telephone number, a subscriber name, an International Mobile Equipment Identifier (IMEI), an International Mobile Subscriber Identifier (IMSI), or an International Circuit Card Identifier (ICCID).

Figure 6:
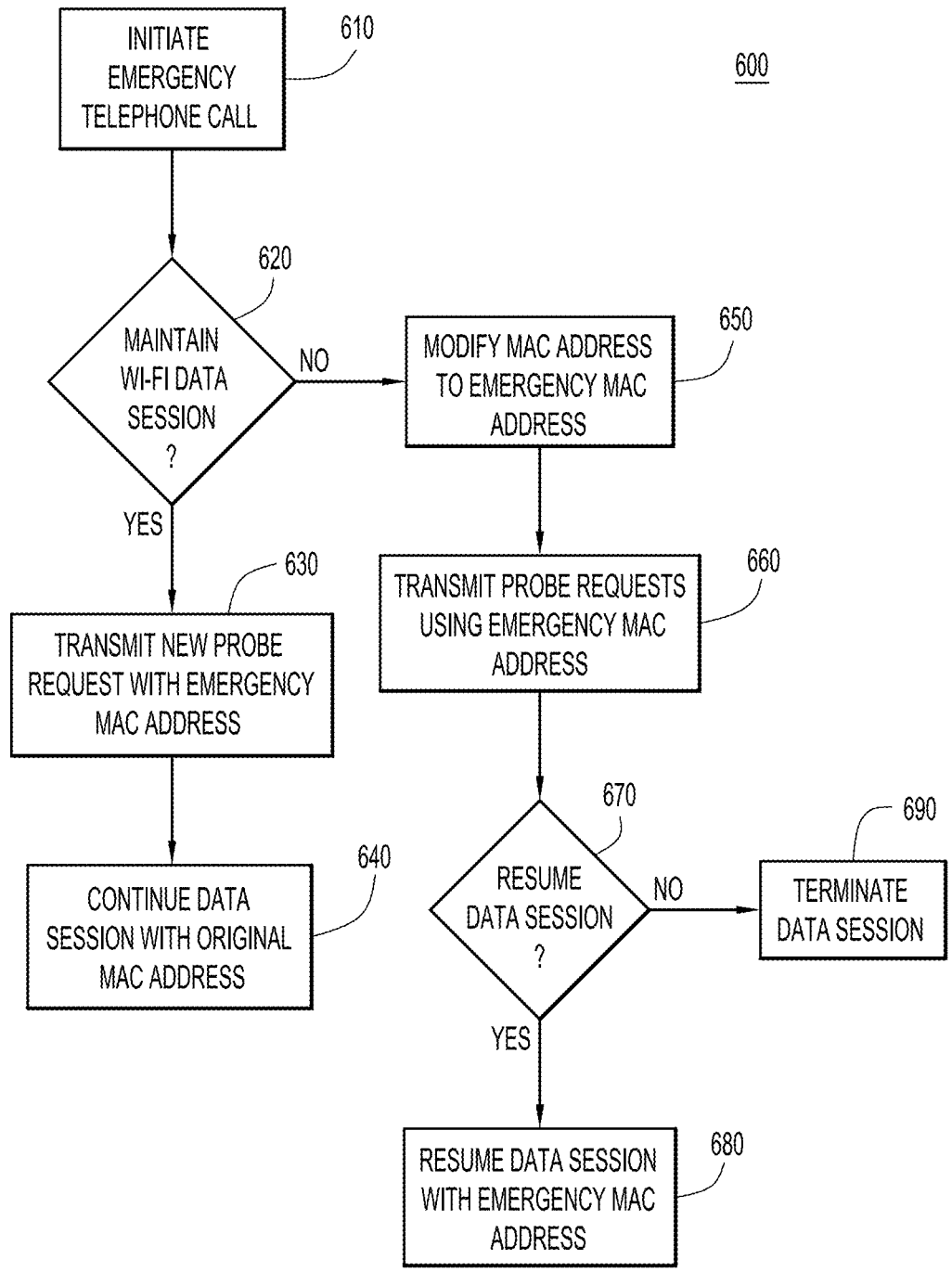
FIG. 6 is a flow diagram illustrating the operations in a mobile user device that enable the device to continue a data session according to an example embodiment.

Referring now to FIG. 6, a flow chart shows the operations in process 600 for handling a data session while making an emergency telephone call. Initially, a mobile device 110 maintains a data session through its wireless network interface, e.g., using a factory assigned MAC address. At 610, the mobile device initiates an emergency telephone call over its cellular telephone network interface. If the mobile device 110 maintains the data session throughout the emergency call, as determined at 620, then the wireless network interface begins to send probe requests using an emergency MAC address at 630. The mobile device 110 may disregard any response to the probe request, since the probe requests are meant to provide location information to the WLAN controllers 145 and GMLC 150. At 640, the mobile device continues the data session using the original MAC address of the mobile device. In one example, the mobile device 110 may broadcast data using two different MAC addresses, e.g., the factory assigned MAC address and the emergency MAC address related to an identifier known to the MSC 130, sequentially or substantially at the same time.

If the mobile device 110 does not maintain the data session, as determined at 620, then the mobile device modifies the MAC address that the wireless network interface is using to the emergency MAC address at 650. Using the emergency MAC address, the mobile device transmits probe requests at 660 to assist in providing location information to the GMLC 150. If the mobile device 110 resumes the data session, as determined at 670, the mobile device may use the emergency MAC address to re-establish the data session. In one example, the mobile device 110 may use credentials established in the original data session to authenticate the mobile device 110 as the same device that was formerly using the original MAC address. In the mobile device 110 does not resume the data session, as determined at 670, the mobile device terminates the data session at 690.

Enabling Wi-Fi device location for use during a wireless call to 9-1-1 can greatly enhance the emergency response with accurate location information. The value-added feature described herein may be accomplished within the control plane of the cellular location services automatically with no intervention by the PSAP required. Cellular Service Providers can offer enhanced indoor location to their enterprise customers. Additionally, the system may have the capability to notify enterprise security of live 9-1-1 calls, providing the location of the caller within the building/campus. Enterprise security could then assist the emergency responders with access to the building/campus providing a more expedited response. One incentive for an enterprise to participate is to provide better emergency services to their constituents.

In one example, the communication between the cellular network's OMA-to-Wi-Fi gateway (e.g., GMLC 150) and the enterprise (e.g., WLAN controllers 145) comprises a protected communication stream with strong authentication. As enterprises make their Wi-Fi location server available for cellular emergency location queries, a national database of enterprises and their geo-coverage may be shared amongst the system service providers that operate the cellular location processes.

In one form, a method is provided for enhancing location information during an emergency call. A mobile device receives user input for an emergency call. In response to receiving the user input, the mobile device initiates an emergency call via a cellular telephone network interface using at least one cellular identifier know to the cellular telephone network. The mobile device also transmits a probe request with an emergency wireless network identifier via a wireless network interface to a wireless computer network. The emergency wireless network identifier is based on the cellular identifier that is known to the cellular telephone network.

In another form, an apparatus is provided for enabling an emergency telephone call with enhanced location detection. The apparatus comprises a cellular telephone network interface, a wireless network interface and a processor. The cellular telephone network interface communicates data with a cellular telephone network. The apparatus is identified by at least one cellular identifier know to the cellular telephone network. The wireless network interface is configured to communicate data with a wireless computer network using a wireless network identifier. In response to user input requesting an emergency call, the processor initiates an emergency call over the cellular telephone network interface. The processor also causes the wireless network interface to transmit a probe request with in emergency wireless network identifier. The emergency wireless network identifier is based on the cellular identifier known to the cellular telephone network.

In a further form, a system is provided for providing enhanced location services. The system comprises a cellular telephone network, a user device, and a wireless computer network. The cellular telephone network is configured to enable telephone call sessions with the user device. The user device is configured to receive user input requesting an emergency call and to initiate the emergency call with the cellular telephone network. The user device uses at least one cellular identifier known to the cellular telephone network to initiate the emergency call. The user device transmits a probe request with an emergency wireless network identifier. The emergency wireless network identifier is based on the cellular identifier known to the cellular telephone network. The wireless computer network enables a computer data session with the user device using a wireless network identifier and stores the probe request with the emergency wireless network identifier.

The above description is intended by way of example only.

What is claimed is:

1. A method comprising:
    at a user device:
        receiving user input requesting an emergency call;
        initiating the emergency call via a cellular telephone network interface using at least one cellular identifier that is known to a cellular telephone network and causing the cellular telephone network to determine a rough geographical area of the user device;
        determining an emergency wireless network identifier based on the at least one cellular identifier known to the cellular telephone network;
        turning on a wireless local area network (WLAN) interface on the user device if it is not otherwise turned on;
        transmitting a probe request, from the user device, with the emergency wireless network identifier to a WLAN controller of a location aware wireless computer network via a wireless connection established by the WLAN interface, causing the cellular telephone network to determine location coordinates in the rough geographical area of the user device by querying the location aware wireless computer network and enabling the cellular telephone network to forward the more accurate location information to an appropriate Public Safety Answer Point (PSAP) for the user device
        determining whether a wireless data session initiated via the WLAN interface prior to the emergency call is maintained during the emergency call; and
        terminating the wireless data session while maintaining a connection with the location aware wireless computer network by changing a wireless network identifier associated with the WLAN interface to the emergency wireless network identifier when the wireless data session is determined to not have been maintained.

2. The method of claim 1, further comprising:
    maintaining the wireless data session with the location aware wireless computer network using the wireless network identifier associated with the WLAN interface when the wireless data session is determined to have been maintained.

3. The method of claim 1, further comprising, subsequent to the terminating, resuming the wireless data session with the location aware wireless computer network using the emergency network identifier and a credential previously obtained with the wireless network identifier.

4. The method of claim 1, wherein the probe request includes the emergency wireless network identifier.

5. The method of claim 1, wherein the cellular identifier comprises at least one of a telephone number, a subscriber name, an International Mobile Equipment Identifier (IMEI), an International Mobile Subscriber Identifier (IMSI), or an International Circuit Card Identifier (ICCID).

6. The method of claim 1, wherein the probe request is transmitted in accordance with a probe timer, and the probe timer is modified in response to receiving the user input requesting an emergency call.

7. An apparatus comprising:
a cellular telephone network interface configured to communicate data with a cellular telephone network, the apparatus identified by at least one cellular identifier that is known to the cellular telephone network and cause the cellular telephone network to determine a rough geographical area of the apparatus;
a wireless local area network (WLAN) interface configured to establish a wireless connection and communicate with a WLAN controller of a location aware wireless computer network; and
a processor configured to:
initiate an emergency call via the cellular telephone network interface using the at least one cellular identifier in response to a user input requesting an emergency call, so that the cellular telephone network determines the rough geographical area of the apparatus;
determine an emergency wireless network identifier based on at least one cellular identifier known to the cellular telephone network;
turn on the WLAN interface if it is not otherwise turned on;
transmit a probe request, via the WLAN interface, to the WLAN controller of the location aware wireless computer network, the probe request including the emergency wireless network identifier and causing the cellular telephone network to determine location coordinates in the rough geographical area of the apparatus by querying the location aware wireless computer network and enabling the cellular telephone network to forward the more accurate location information to an appropriate Public Safety Answer Point (PSAP) for the apparatus
determine whether a wireless data session initiated via the WLAN interface prior to the emergency call is maintained during the emergency call; and
terminate the wireless data session while maintaining a connection with the location aware wireless computer network by changing a wireless network identifier associated with the WLAN interface to the emergency wireless network identifier when the wireless data session is determined to not have been maintained.

8. The apparatus of claim 7, wherein the processor is further configured to:
maintain the wireless data session with the location aware wireless computer network using the wireless network identifier associated with the WLAN interface when the wireless data session is determined to have been maintained.

9. The apparatus of claim 7, wherein, subsequent to the terminating, the processor is further configured to:
resume the wireless data session with the location aware wireless computer network via the WLAN interface using the emergency network identifier and a credential previously obtained with the wireless network identifier.

10. The apparatus of claim 8, wherein the probe request includes the emergency wireless network identifier.

11. The apparatus of claim 7, wherein the processor is configured to further instruct the WLAN interface to transmit the probe request according to a probe timer, and to modify the probe timer in response to the user input requesting an emergency call.

12. The apparatus of claim 7, wherein the cellular identifier comprises at least one of a telephone number, a subscriber name, an International Mobile Equipment Identifier (IMEI), an International Mobile Subscriber Identifier (IMSI), or an International Circuit Card Identifier (ICCID).

13. A system comprising:
a user device configured to:
receive user input requesting an emergency call;
initiate the emergency call with a cellular telephone network using at least one cellular identifier that is known to the cellular telephone network and cause the cellular telephone network to determine a rough geographical area of the apparatus;
determine an emergency wireless network identifier based on at least one cellular identifier known to the cellular telephone network;
turn on a wireless local area network (WLAN) interface on the user device if it is not otherwise turned on; and
transmit, via the WLAN interface, a probe request with the emergency wireless network identifier; and
a location aware wireless computer network including a WLAN controller configured to:
receive the probe request via a wireless connection established with the WLAN interface of the user device;
determine location coordinates of the user device within the rough geographical area; and
respond to a query from the cellular telephone network with the location coordinates, causing the cellular telephone network to forward the more accurate location information to an appropriate Public Safety Answer Point (PSAP) for the user device
wherein the user device is further configured to:
determine whether a wireless data session initiated via the WLAN interface prior to the emergency call is maintained during the emergency call;
terminate the wireless data session while maintaining a connection with the location aware wireless computer network by changing a wireless network identifier associated with the WLAN interface to the emergency wireless network identifier when the wireless data session is determined to not have been maintained.

14. The system of claim 13, wherein the user device is further configured to:
maintain the wireless data session with the location aware wireless computer network using the wireless network identifier associated with the WLAN interface when the wireless data session is determined to have been maintained.

15. The system of claim 13, wherein, subsequent to the terminating, the user device is configured to resume the computer data session initiated with the location aware wireless computer network using the emergency network identifier and a credential previously obtained with the wireless network identifier.

16. The system of claim 13, wherein the probe request includes the emergency wireless network identifier.

17. The system of claim 13, wherein the user device is configured to transmit the probe request according to a probe timer, and to modify the probe timer in response to the user input requesting an emergency call.

18. The system of claim 13, wherein the cellular identifier comprises at least one of a telephone number, a subscriber name, an International Mobile Equipment Identifier (IMEI), an International Mobile Subscriber Identifier (IMSI), or an International Circuit Card Identifier (ICCID).

19. The system of claim 14, wherein the user device is further configured to:
   maintain the wireless data session with the location aware wireless computer network using the wireless network identifier associated with the WLAN interface while broadcasting the wireless network identifier and the emergency wireless network identifier.

20. The method of claim 2, further comprising:
   maintaining the wireless data session with the location aware wireless computer network using the wireless network identifier associated with the WLAN interface while broadcasting the wireless network identifier and the emergency wireless network identifier.

* * * * *